United States Patent [19]

Narayan et al.

[11] 4,108,809
[45] Aug. 22, 1978

[54] NOVEL PREPOLYMERS, FLAME RETARDANT INTERPOLYMERS PREPARED THEREFROM, AND PROCESSES FOR THE PREPARATION THEREOF

[75] Inventors: Thirumurti Narayan, Riverview; Moses Cenker, Trenton, both of Mich.

[73] Assignee: BASF Wyandotte Corporation, Wyandotte, Mich.

[21] Appl. No.: 745,628

[22] Filed: Nov. 29, 1976

[51] Int. Cl.$^2$ ............................................. C08J 9/00
[52] U.S. Cl. ............................ 521/136; 260/30.4 R; 260/45.8 A; 260/347.8; 260/838; 521/181; 528/151; 528/153; 528/155; 528/159
[58] Field of Search ............ 260/2.5 F, 54, 56, 45.8 A, 260/347.8, 30.4 R

[56] References Cited

U.S. PATENT DOCUMENTS

| | | | |
|---|---|---|---|
| 2,453,704 | 11/1948 | Dunlop et al. | 260/57 R |
| 2,462,054 | 2/1949 | Delmonte | 260/47 |
| 2,471,631 | 5/1949 | Lebach | 260/59 |
| 2,518,388 | 8/1950 | Simons | 260/68 |
| 2,655,491 | 10/1953 | Edmunds et al. | 260/56 |
| 2,948,639 | 8/1960 | Price | 260/829 |
| 3,006,871 | 10/1961 | Sunderland | 260/68 |
| 3,299,167 | 1/1967 | Knowlson et al. | 260/19 N |
| 3,312,650 | 4/1967 | Case et al. | 260/56 |
| 3,390,107 | 6/1968 | Tashlick et al. | 260/2.5 F |
| 3,549,584 | 12/1970 | Sekera | 260/56 |
| 3,692,706 | 9/1972 | Igglesden | 260/59 |
| 3,725,333 | 4/1973 | Adkins et al. | 260/38 |
| 3,793,286 | 2/1974 | Petersen et al. | 260/38 |
| 3,919,127 | 11/1975 | Larsen et al. | 260/39 R |
| 4,016,111 | 4/1977 | Wolff et al. | 260/72 R |

*Primary Examiner*—Melvyn I. Marquis
*Attorney, Agent, or Firm*—Bernhard R. Swick; L. S. Van Landingham, Jr.; Robert E. Dunn

[57] ABSTRACT

Liquid prepolymers are prepared by interpolymerizing monomers including a hydroxy aromatic compound, an aldehyde and furfuryl alcohol. The resultant liquid prepolymers have a viscosity of about 100–500,000 centipoises at 25° C. and contain about 1.1–6 moles of interpolymerized aldehyde and about 3.1–15 moles of interpolymerized furfuryl alcohol for each mole of interpolymerized hydroxy aromatic compound. The prepolymers are highly reactive and may be polymerized with or without other monomers to produce flame retardant solid or cellular interpolymers. In one variant, flame retardant solid or cellular polymers are produced by interpolymerizing organic polyisocyanates with the prepolymers. In another variant, solid or cellular interpolymers are produced by polymerizing the prepolymers without monomers such as polyisocyanate in the presence of unreacted furfuryl alcohol. Processes are provided for preparing the aforementioned novel liquid prepolymers and solid or cellular interpolymers.

63 Claims, No Drawings

NOVEL PREPOLYMERS, FLAME RETARDANT INTERPOLYMERS PREPARED THEREFROM, AND PROCESSES FOR THE PREPARATION THEREOF

THE BACKGROUND OF THE INVENTION

1. The Field of the Invention

The present invention broadly relates to novel liquid prepolymers prepared from monomers including a hydroxy aromatic compound, an aldehyde and furfuryl alcohol. The invention further relates to novel solid or cellular interpolymers prepared from the liquid prepolymers. In another variant the invention is concerned with improved processes for preparing the liquid prepolymers and solid or cellular interpolymers.

2. The Prior Art

Prepolymers have been prepared heretofore by interpolymerizing certain hydroxy aromatic compounds, aldehydes and furfuryl alcohol. The resultant prepolymers are known to be reactive and capable of being further polymerized. However, the prior art prepolymers contain less than 3.0 moles of interpolymerized furfuryl alcohol for each mole of the interpolymerized hydroxy aromatic compound and/or upon further polymerization, the interpolymers prepared therefrom do not consistently have good mechanical and/or physical properties in combination with a high degree of flame retardance.

The above prior art prepolymers also tend to have widely varying properties from run to run, and especially with respect to the viscosity, molecular weight and ratio of interpolymerized monomers. As a result, upon further polymerization of the prepolymers, it was not possible heretofore to prepare solid or cellular interpolymers having predictable and reproducible mechanical and/or physical properties. This is especially true when preparing poured in place low density cellular interpolymers having densities of approximately 1-10 pounds per cubic foot of the type often used for thermal and/or sound insulation. The flame retardant properties of these solid or cellular prior art interpolymers also are not outstanding when used in environments where a fire hazard exists such as in certain construction and industrial applications.

As a result of the aforementioned and other disadvantages and/or deficiencies, the art has long sought without success an entirely satisfactory process for preparing novel liquid prepolymers of the above defined type which have predetermined and reproducible molecular weights, viscosities and interpolymerized monomer contents, and also a process whereby the resultant prepolymers may be further polymerized with or without other monomers to produce improved interpolymers characterized by excellent mechanical and/or physical properties in combination with exceptional flame retardant properties. However, such processes and the novel prepolymer and interpolymer products prepared thereby were not available prior to the present invention.

THE SUMMARY OF THE INVENTION

The aforementioned disadvantages and/or deficiencies of the prior art are overcome by providing a novel liquid prepolymer, and/or by thereafter employing the same in the preparation of the improved flame retardant solid or cellular interpolymers of the invention. The prepolymer is prepared by interpolymerizing monomers including a hydroxy aromatic compound, an aldehyde and furfuryl alcohol under conditions whereby the resultant reaction product has a viscosity of about 100–500,000 centipoises at 25° C. and contains about 1.1–6 moles of interpolymerized aldehyde and about 3.1–15 moles of interpolymerized furfuryl alcohol for each mole of interpolymerized hydroxy aromatic compound. The improved solid or cellular flame retardant interpolymers are provided by polymerizing the prepolymers with polyisocyanates. Solid or cellular interpolymers are provided by polymerizing the prepolymers without other monomers such as polyisocyanates in the presence of unreacted furfuryl alcohol. The invention additionally provides novel processes for preparing the aforementioned prepolymer and flame retardant interpolymers.

The detailed description of the invention and the specific examples appearing hereinafter may be referred to for a more complete and comprehensive understanding of the invention.

THE DETAILED DESCRIPTION OF THE INVENTION INCLUDING THE PRESENTLY PREFERRED VARIANTS AND EMBODIMENTS THEREOF

The prepolymers of the invention are prepared by interpolymerizing in an aqueous reaction medium at least three monomers including (a) a hydroxy aromatic compound selected from the group consisting of phenol, resorcinol, cresol, xylenol, chlorophenol, bisphenol-A, alpha-naphthol and beta-naphthol, (b) an aldehyde containing about 1-8 carbon atoms, and (c) furfuryl alcohol to produce a reactive liquid prepolymer. The interpolymerization is continued until the prepolymer thus produced has a viscosity of about 100–500,000 centipoises at 25° C. and contains about 1.1–6 moles of interpolymerized aldehyde and about 3.1–15 moles of interpolymerized furfuryl alcohol for each mole of the interpolymerized hydroxy aromatic compound. The resultant prepolymers are highly reactive and may be used alone or with other monomers such as polyisocyanates which are reactive with active hydrogen containing compounds in the preparation of novel flame retardant solid or cellular interpolymers. It will be appreciated that there are certain preferred variants and embodiments of the invention, and that such preferred variants and embodiments will be described in greater detail and with greater particularity hereinafter.

The hydroxy aromatic compounds which are useful in practicing the present invention are reactive with the aldehyde. Examples include phenol, resorcinol, cresol, xylenol, chlorophenol, bisphenol-A, alpha-naphthol, beta-naphthol, and admixtures containing two or more thereof. Phenol is preferred in most instances.

The aldehydes which are useful contain about 1-8 carbon atoms and are reactive with the selected hydroxy aromatic compound. Mixtures containing two or more aldehydes having 1-8 carbon atoms may be used. Preferred aldehydes contain about 1-5 carbon atoms and include formaldehyde, acetaldehyde, propionaldehyde and furfuraldehyde. Formaldehyde usually gives the best results. Suitable sources of formaldehyde includes its commercially available forms such as formalin, which is usually a 37% to 45% aqueous solution of formaldehyde in water, paraformaldehyde which is a solid linear polymer of formaldehyde, and trioxane which is a solid trimer of formaldehyde, all of which are intended to be embraced herein by the term formaldehyde. For the purposes of the present invention, the total number of monomeric units of formaldehyde making up the paraformaldehyde and trioxane are considered to be equivalent to monomeric formaldehyde when mole ratios are calculated.

The furfuryl alcohol is reactive with the aforementioned hydroxy aromatic compound, aldehyde and/or the reaction products thereof such as resoles. The term "furfuryl alcohol" as used herein embraces monomeric furfuryl alcohol and the low molecular weight oligomers or polymers thereof containing several monomeric units such as the dimer, trimer, tetramer, pentamer and admixtures thereof. Monomeric furfuryl alcohol often contains such oligomers or polymers in varying concentrations and for the purposes of the present invention, the total monomeric units making up such oligomers or polymers are considered to be equivalent to monomeric furfuryl alcohol when mole ratios are calculated. It is understood that high molecular weight preformed homopolymers of furfuryl alcohol are not intended to be embraced by the term furfuryl alcohol.

The prepolymers are advantageously prepared by interpolymerizing the aforementioned monomers by one of three presently preferred variants of the process of the invention. In accordance with one of the variants, a preformed water soluble resole resin containing about 1.1-3 moles of interpolymerized aldehyde for each mole of interpolymerized hydroxy aromatic compound is reacted with furfuryl alcohol in an aqueous medium under acidic conditions. The water content of the aqueous medium is sufficient to dissolve the reactants and provide a suitable initial fluidity for the reaction mixture and may be, for example, about 50-200% by weight of the resole resin and preferably about 100-150% by weight. The furfuryl alcohol should be present in a substantial excess over that amount theoretically required to provide the desired mole ratio of interpolymerized furfuryl alcohol to interpolymerized hydroxy aromatic compound in the final prepolymer product. The excess monomeric or unreacted furfuryl alcohol acts as a fluidizing solvent for the viscous prepolymer reaction product and may be present in an amount, for example, of about 1-10 moles and preferably about 3-7 moles above the 3.1-15 moles of interpolymerized furfuryl alcohol present in the final prepolymer product. Thus, the reaction mixture may contain about 4-25 moles and preferably about 7-15 moles of furfuryl alcohol for each mole of hydroxy aromatic compound interpolymerized in the resole resin. The reaction may be carried out at a suitable temperature such as, for example, about 50°-120° C. and preferably at about 80°-100° C. The pH of the reaction mixture should be below 5 and is preferably about 1-3.

The interpolymerization is continued until the desired mole ratio of furfuryl alcohol has reacted with the resole resin and the interpolymerization may be terminated thereafter by addition of sufficient base to adjust the reaction mixture to a pH value of not less than about 5.0 and preferably to about 6-8. The reaction time usually will vary inversely with the reaction temperature, but typical reaction times are about 0.25-5 hours and preferably about 0.5-2 hours. The acid used in acidifying the reaction mixture may be any suitable inorganic or organic acid which is capable of providing the desired pH value for the reaction and which is not reactive with the reactants and/or reaction product is an adverse manner. Mixtures of mineral and/or organic acids may be used. Examples of mineral acids include hydrochloric acid, sulfuric acid and the phosphoric acids and examples of organic acids including carboxylic acids containing 1-8 carbon atoms and organic sulfonic acids such as aromatic sulfonic acids containing 6-12 carbon atoms. Examples of bases which may be used to neutralize the reaction mixture and thereby terminate the reaction include the alkali metal and alkaline earth metal oxides and hydroxides, such as sodium hydroxide, potassium hydroxide, calcium hydroxide and barium hydroxide as well as their corresponding oxides, and tertiary amines or amino alcohols containing 3 to 12 carbon atoms.

Thereafter, all or part of the water initially present, the water of reaction and/or the unreacted furfuryl alcohol may be removed from the reaction mixture under reduced pressure and/or at elevated temperature following conventional prior art procedures and conditions such as those used to remove water and reactants from reaction mixtures in the preparation of resole resins. A typical final temperature is about 40°-100° C, and preferably about 70° C. at a reduced pressure of about 1 Torr. However, as is well understood in this art, the temperature is sufficiently high and/or the pressure is sufficiently low to reduce the amount of water and/or furfuryl alcohol to desired levels without adverse thermal decomposition of the prepolymer product.

The water content of the prepolymer should be reduced to not more than 10% by weight and preferably to less than 5% by weight. Typical water contents for may uses of the prepolymer are 0.1-10% by weight and preferably about 0.5-5% by weight. For certain specialized applications, such as when the prepolymer is to be reacted with an organic polyisocyanate in the preparation of polyurethanes, the water content should be less than 3% by weight and preferably less than 2.0 by weight. Typical water contents for the reaction with polyisocyanates are about 0.01-3% by weight and preferably about 0.05-2.0% by weight. The water contents referred to herein are as determined by the Karl Fischer method.

The monomeric or unreacted furfuryl alcohol content of the reaction mixture may or may not be reduced depending upon the desired end use of the prepolymer. In instances where the prepolymer is reacted with one or more organic polyisocyanates in the preparation of polyurethanes, then for better results the unreacted furfuryl alcohol content should be less than 10% by weight and preferably less than 5% by weight. Satisfactory solid or cellular polyurethanes may be prepared from prepolymers containing about 0.01-10% by weight of unreacted furfuryl alcohol and even better results are obtained when the furfuryl alcohol content is about 0.05-5.0% by weight. The prepolymer may contain about 1-10 moles of unreacted furfuryl alcohol, and preferably about 2-5 moles, for each mole of interpolymerized hydroxy aromatic compound in instances where it is desired to impart a maximum degree of flame retardance to a solid or cellular interpolymer prepared from the prepolymer. Also, the viscosity of the normally viscous prepolymer may be reduced to a desired level by providing unreacted furfuryl alcohol therein in an amount of about 1-10 moles, and often about 2-5 moles, for each mole of interpolymerized hydroxy aromatic compound. This latter variant is of importance when preparing foam interpolymers and especially low density foams or foam poured in place.

Preformed liquid resole resins suitable for interpolymerizing with furfuryl alcohol are well known and are disclosed in numerous patents and other publications. Examples of three textbooks relating to the preparation of resole resins are *Preparative Methods of Polymer Chemistry*, by Sorenson and Campbell, Interscience Publishers, N.Y., N.Y.; *The Chemistry of Phenolic Resins*, by Robert W. Martin, John Wiley and Sons, Inc., New York, New York (1956); and *Plastic Foams*, edited by Kurt C. Frisch, et al, Marcel Dekker, Inc., New York, New York (1973). The disclosures of these textbooks and the references cited therein are incorporated herein by reference. As a general rule, liquid resole resins are prepared by reacting one or more hydroxy aromatic compounds with one or more aldehydes in aqueous phase and in the presence of an alkaline catalyst, and in amounts to provide the aforementioned interpolymerized ratios. Examples of alkaline catalysts include the alkali metal hydroxides and the alkaline earth metal hydroxides, of which sodium and/or potassium hydroxides are usually preferred. The amount of the alkaline catalyst is in accordance with prior art practice and may be for example, about 0.5–5% by weight of the phenol. The pH value of the reaction mixture may be, for example, about 8–10. The reaction may proceed under agitation at a temperature of about 50°–100° C. over a period of, for example, about 1–10 hours. At the end of the reaction period, the reaction mixture is adjusted by addition of a suitable acid such as hydrochloric acid or sulfuric acid to a pH value of approximately 6–7 and is dehydrated under vacuum. The resultant preformed resole resin is then reacted with the furfuryl alcohol. The monomeric units interpolymerized in the resole resin are considered to be monomers in calculating the mole ratios referred to herein.

In a second variant, the prepolymer may be prepared by interpolymerizing 1.1–6 moles of the aldehyde for each mole of the hydroxy aromatic compound in an aqueous medium under alkaline reaction conditions resulting in the preparation of a resole resin. The catalyst may be a base such as an alkali metal oxide or hydroxide as aforementioned in a quantity to provide a pH value of about 7.5–11 and preferably about 8–9. The interpolymerization may be carried out at an elevated temperature such as 50°–100° C. and preferably at about 80°–90° C. over a period of approximately 0.5–5 hours and preferably about 1.5–3 hours. Thereafter, the reaction mixture may be acidified by addition of an acid and about 5–25 moles of the furfuryl alcohol are added and reacted therewith at a pH of less than 5 and preferably about 1–3 until 3.1–15 moles of furfuryl alcohol have interpolymerized with the resole as aforementioned. The pH value of the reaction mixture is then adjusted and the water of reaction and/or the excess furfuryl alcohol are removed under reduced pressure and/or at elevated temperature. It is understood that the general procedure of the second variant following the resole preparation may be substantially the same as in the first variant.

In accordance with a third variant, the prepolymer may be prepared by interpolymerizing one mole of the hydroxy aromatic compound, 1.1–6 moles of the aldehyde and 5–25 moles of furfuryl alcohol in an aqueous reaction medium under acidic reaction conditions until 1.1–6 moles of aldehyde and 3.1–15 moles of furfuryl alcohol have interpolymerized with each mole of the hydroxy aromatic compound. The pH value of the reaction mixture is substantially less than 7 and is preferably less than 5, and may be, for example, 1–3. The reaction time may be about 1–10 hours and is preferably about 2–4 hours. Thereafter, the reaction mixture may be neutralized by addition of a base and all of the water and part of the excess unreacted furfuryl alcohol may be removed under reduced pressure and at elevated temperature. The base and acid used for controlling the pH value and the procedure for removing the water and part of the unreacted furfuryl alcohol may be substantially the same as in the first variant.

The aforementioned three variants for preparing the prepolymers of the invention are illustrated in the examples appearing hereinafter. In each instance, the reaction product is a reactive liquid prepolymer which may be cured to produce a rigid interpolymer. The prepolymer has a viscosity of about 100–500,000 centipoises and preferably about 200–100,000 centipoises at 25° C. and contains about 1.1–6 moles and preferably about 1.1–3 moles of interpolymerized aldehyde and about 3.1–15 moles and preferably about 3.1–10 moles of interpolymerized furfuryl alcohol for each mole of the hydroxy aromatic compound interpolymerized therewith. The water content should be less than 10% and preferably less than 5%. In instances where a polyisocyanate interpolymer is reacted with the prepolymer, then the unreacted furfuryl alcohol content should be reduced to less than 5% by weight and preferably to less than 2% by weight. Where a maximum degree of flame retardancy is to be imparted to an interpolymer prepared from a viscous prepolymer and/or a low density foam is prepared from a viscous prepolymer, then the unreacted furfuryl alcohol content should be about 1–10 moles and preferably about 3–8 moles for each mole of the interpolymerized hydroxy aromatic compound.

The resultant liquid prepolymers are highly reactive and may be further interpolymerized with or without other monomers to prepare solid or foam interpolymers. In one variant of the invention, an acid catalyst is admixed with the prepolymer in an amount to catalyze the further interpolymerization thereof and produce a hardened interpolymer therefrom. If desired, elevated temperatures such as 50°–100° C. may be used but are not necessary as the prepolymer is highly reactive. Examples of acid catalysts include mineral acids such as hydrocholoric acid, sulfuric acid and phosphoric acid, organic acids such as oxalic acid, chloroacetic acid and aromatic sulfonic acids, and alkyl acid phosphates such as ethyl acid phosphate and dimethyl acid pyrophosphate. The catalyst may be employed in an amount of, for example, about 0.5–10% by weight. In general, the type and amount of acid catalyst and the curing conditions for the liquid prepolymer may be approximately the same as for liquid phenol-formaldehyde resoles of the prior art. The three textbooks mentioned hereinbefore may be referred to for further details.

In instances where it is desired to prepare a solid interpolymer, then the further interpolymerization of the liquid prepolymer is preferably carried out under conditions whereby an undesirable number of cells do not form in the resultant interpolymer. Thus, solid polymers are prepared in the absence of a blowing agent and, if desired, under superatmospheric pressure to reduce the tendency of cells to form in the curing prepolymer. When a foam is prepared from the prepolymer, it is necessary to admix a blowing agent and a surfactant or stabilizing agent therewith prior to or during curing with the acid catalyst.

The surfactant may be suitable stabilizing agents of the types used in stabilizing phenolic resole resin foams.

A large number of suitable surfactants are known and are disclosed in the three textbooks mentioned hereinbefore and the references cited therein. The preferred stabilizing agents are water soluble and acid stable surface active agents, and for best results they are also non-hydrolyzable. Commonly used surfactants include siloxane-oxyalkylene copolymers such as those disclosed in U.S. Pat. No. 3,271,331, British Pat. No. 1,091,238 and Netherlands application No. 6,609,096, and the silicones marketed by Union Carbide Corporation and identified as "L-530, L-5310, L-5340 and L-5410." The products of the condensation of ethylene oxide with castor oil and alkyl phenols disclosed in British Pat. No. 1,062,850, and the polyoxyethylene sorbitan fatty acid esters disclosed in U.S. Pat. No. 3,300,419, or the "Tween" series of surfactants are also useful. Additional surfactants of the cationic and anionic type are disclosed in U.S. Pat. No. 2,933,461 and British Pat. No. 586,199, respectively. A proprietary product marketed by Dow Corning Corporation and identified as "DC-193", which is said to be a polyalkyl siloxane-polyoxyalkylene copolymer, is especially useful. Other nonionic surfactants are polyethers and polyalcohols, including the condensation products of alkylene oxides, such as ethylene oxide and propylene oxide, with alkyl phenols, fatty acids, alkyl silanes and silicones. The disclosures of the above patents are incorporated herein by reference. The surface active agents may be employed in the amounts recommended in accordance with prior art practice such as about 0.5–5% by weight of the prepolymer. Better results often are obtained when using amounts varying from about 1 to about 3 percent by weight based on the weight of the prepolymer, with best results usually being achieved at about 2 percent by weight.

Prior art volatile blowing agents for phenolic resole resins may be used as the blowing agent for the prepolymer. Numerous blowing agents of this type are known and are disclosed in the three textbooks mentioned hereinbefore and the references cited therein. Presently preferred Examples of volatile blowing agents include the halogenated hydrocarbons. The halogenated hydrocarbon blowing agents usually contain about 1-3 carbon atoms and have one or more halogen atoms attached directly thereto such as fluorine, chlorine and/or bromine. Suitable halogenated hydrocarbon blowing agents are sold under the trademark Freon®, such as Freon 11 and Freon 113. Other halogenated hydrocarbon blowing agents include methylene chloride, tetrachloromethane, trichloromethane, monochlorodifluoromethane, dichlorodifluoromethane, 1,2-dichloro-1,1,2,2-tetrafluoroethane, 1,2,2-trichloro-1,1,2-trifluoroethane and 1,2-difluoroethane.

The blowing agent may be present in the prepolymer to be foamed in about the same quantities as employed in preparing the prior art foams, i.e., in an amount to provide a desired density in the foam product. The foam density may be, for example, about 1–50 pounds per cubic foot and is preferably about 1–30 pounds per cubic foot. The weight percent of blowing agent that is required in the prepolymer to achieve the desired density will vary with the molecular weight of the blowing agent. However, typical weight percentages are about 1–40 parts by weight and preferably about 10–25 parts by weight, based upon the weight of the prepolymer. The blowing agent and surfactant are admixed in the prepolymer following prior art techniques such as by vigorous agitation with a rotary beater or propeller type agitator. The general techniques and procedures that are used in preparing foam from the prepolymer may be substantially the same as used in preparing prior art phenolic foams.

The prepolymers also may be further interpolymerized with an additional monomer or prepolymer which is capable of reacting with the active hydrogen thereof to produce a solid interpolymer. The presently preferred monomers or prepolymers to be reacted with the prepolymers are organic polyisocyanates of the type employed in the preparation of polyurethanes from polyols. A large number of such organic polyisocyanates are known and may be used in practicing the present invention. The presently preferred organic polyisocyanates include diphenylmethane diisocyanate, crude diphenylmethane diisocyanate, 2,4- and 2,6-isomeric mixtures of toluene diisocyanate, prepolymers containing active isocyanate groups and quasi-prepolymers containing active isocyanate groups. Additional examples of organic polyisocyanates are disclosed in U.S. Pat. Nos. 3,186,969, 3,398,094, 3,470,118, 3,682,845, 3,686,101, 3,770,671 and 3,872,034, the disclosures of which are incorporated herein by reference.

The amount of the organic polyisocyanate that is used may be in accordance with the prior art practices that are disclosed in the above patents. It is usually preferred that the ratio of the organic polyisocyanate to the prepolymer be about 1:4 to 1:1 and is preferably 1.5:4 to 3:4 on a weight basis. The best ratio is usually about 1:2 by weight.

When producing polyurethanes, an admixture is prepared containing the organic polyisocyanate and the prepolymer in amounts as discussed above, and a suitable catalyst is admixed therewith in an amount to effect the curing. Elevated curing temperatures such as 50°–100° C. usually are not necessary, but may be used when desired. The catalyst may be an acid catalyst such as discussed above for curing the prepolymer alone, but preferably a catalyst mixture is employed which includes both the acid catalyst and a prior art catalyst for curing polyurethanes. Numerous examples of catalysts for curing polyurethanes are disclosed in the above mentioned patents. The presently preferred polyurethane catalyst is an organic amine containing a tertiary amino group such as triethanolamine and other tertiary hydroxy amines containing, for example, about 1–5 carbon atoms in the chains attached to the nitrogen atom. Still other catalysts for curing polyurethanes include organotin compounds. The polyurethane catalyst may be employed in the quantities suggested in the prior art including the above patents. The said catalyst may be used in the quantities mentioned hereinbefore and the polyurethane catalyst may be used in an amount of, for example, about 0.01–5% by weight and preferably 0.1–2% of the prepolymer. The prepolymer should contain less than 3.0% by weight of water, and preferably less than 2.0% by weight.

In instances where a solid interpolymer including a polyisocyanate is to be prepared, an admixture containing the prepolymer, organic polyisocyanate and catalyst in the quantities discussed above is prepared under vigorous conditions of agitation so as to prepare a uniform mixture. The resultant mixture is then shaped into a desired configuration and allowed to cure at room or elevated temperature until a hardened interpolymer shape is formed. When a foam is prepared, a surfactant or stabilizing agent and a blowing agent are admixed in the formulation to thereby produce a cured cellular structure. The surfactant and blowing agent, as well as the general procedure to be used in preparing foams from polyisocyanates, may be as previously discussed when preparing foams from the prepolymer alone.

The solid interpolymer products separated from the prepolymer alone or in admixture with monomers such as organic polyisocyanates are useful in preparing plastic articles. The curable compositions also are useful as casting resins. The foam products prepared from the prepolymer alone, or by interpolymerization with other monomers such as organic polyisocyanates, are useful as thermal or sound insulation. The foam is open cell as distinguished from closed cell, but it has insulation properties comparable to fiberglass.

The prepolymers have an exceptionally high content of interpolymerized furfuryl alcohol which greatly improves the flame retardant properties of interpolymers prepared therefrom. The flame retardant properties of the solid and foam interpolymers may be further enhanced by providing unpolymerized or monomeric furfuryl alcohol in the liquid prepolymer prior to curing in quantities up to 10 moles for each mole of interpolymerized hydroxy aromatic compound. The resultant highly flame retardant interpolymers have excellent physical and mechanical properties in combination with greatly increased flame retardance. The prepolymers, as well as the solid or foam interpolymers prepared therefrom, may be produced on a commercial scale and with predetermined reproducible properties from run to run.

content was as noted in Table I. The water was removed initially employing a water aspirator, and thereafter using a vacuum pump until the final pot temperature was 50° C. at 1 Torr pressure. The hydroxyl number and Brookfield viscosity in cps at 25° C were determined following conventional prior art procedures. The resultant experimental details and data are tabulated below in Table I.

TABLE I

| Preparation of Resole Resins | | | |
|---|---|---|---|
| Resole Resin Number | 1 | 2 | 3 |
| Phenol, g. | 376 | 752 | 752 |
| Phenol, moles | 4 | 8 | 8 |
| *Formalin, g. | 888 | 1776 | 1776 |
| Formaldehyde, moles | 11 | 22 | 22 |
| Yield of Resole, g. | 622 | 1203 | 1309 |
| Hydroxyl Number | — | 1077 | — |
| Water, % (Karl Fischer Method) | — | 0.004 | 0.04 |
| Brookfield Viscosity, cps. at 25° C. | — | 332 | 500 |

*37% aqueous formaldehyde solution

EXAMPLE II

This Example illustrates the preparation of additional phenol-formaldehyde resole resins. The general procedure of this Example was the same as that of Example I except where indicated to the contrary. The experimental details and data are recorded hereinafter in Table II.

TABLE II

| Resole Resin Number | PREPARATION OF RESOLE RESINS | | | | | | | | | |
|---|---|---|---|---|---|---|---|---|---|---|
| | 1 | 2 | 3 | 4 | 5 | 6 | 7 | 8 | 9 | 10 |
| Phenol, g (mole) | 846 (9) | 1128 (12) | 188.2 (2) | 1128 (12) | 1034 (11) (12) | 1128 (2) | 188.2 (3.96) | 372 (3) | 282 (9) | 846 |
| Formaldehyde 37%, g. (mole) | 1095 (13.5) | 1988 (24.5) | 324.4 (4) | 2664 (32.8) | 2442 (30.1) | 2664 (32.8) | 486.5 (6) | 973 (12) | 973 (12) | 2997 (37) |
| Fohmaldehyde-phenol ratio | 1.5 | 2.0 | 2.0 | 2.73 | 2.73 | 2.73 | 3.0 | 3.0 | 4.0 | 4.1 |
| pH of reaction | 8.5 | 8.5 | 8.5 | 8.5 | 8.5 | 8.5 | 8.5 | 8.5 | 8.5 | 8.5 |
| Reaction temp., ° C/hrs. | 90/2 | 90/2 | 70/2 | 90/2 | 90/2 | 90/2 | 90/2 | 90/2 | 90/2 | 90/2 |
| Resole, g. | 1169 | 1761 | 283 | 1965 | 1832 | 1965 | 309 | 644 | 481 | 1729 |
| Volatiles, g. | 702 | 1353 | 234 | 1762 | 1444 | 1778 | 340 | 648 | 703 | 2031 |
| Viscosity of resole, cps. at 25° C | 690 | 800 | 120 | ND* | 520 | 490 | ND* | ND* | ND* | 960 |

*not determined

The foregoing detailed description and the following specific examples are for purposes of illustration only, and are not intended as being limiting to the spirit or scope of the appended claims.

EXAMPLE I

This Example illustrates the preparation of phenol-formaldehyde resole resins for further reaction with furfuryl alcohol when preparing prepolymers in accordance with the invention. The experimental details for three different runs are given in Table I.

A three-liter reaction vessel equipped with a reflux condenser, addition funnel, thermometer, stirrer and an inlet for nitrogen gas was charged with the amounts of phenol and formaldehyde indicated in Table I. The formaldehyde was added as a 37% by weight aqueous solution (formalin). Sufficient aqueous sodium hydroxide (30% by weight) was added to the reaction mixture to adjust the pH value to 8.5.

The resultant reaction mixture was gradually heated to a reaction temperature of 90° C., and the temperature was maintained at 90° C. over a reaction period of two hours. The reaction product was cooled to 40° C. and sufficient aqueous sulfuric acid (30% by weight) was added to reduce the pH value to 5.5. Thereafter water was removed under reduced pressure until the water

EXAMPLE III

This Example illustrates the preparation of resole-furfuryl alcohol prepolymers from preformed resoles and furfuryl alcohol.

A mixture of 154 grams of Resole Resin No. 1 of Example I, 203 grams of water, and 980 grams of furfuryl alcohol (10 moles) was acidified with aqueous sulfuric acid (30% by weight) until a pH value of 2.5 was reached. The resultant reaction mixture was gradually heated to a reaction temperature of 98°–100° C. and was maintained at this temperature over a reaction period of 0.5 hour. The polymerization was terminated at the end of the reaction period by addition of sufficient aqueous sodium hydroxide solution (30% by weight) to increase the pH value of the reaction mixture to 7.5. Thereafter water and unreated furfuryl alcohol were removed under reduced pressure. The yield was 806 grams of resole-furfuryl alcohol prepolymer having a Brookfield viscosity of 198 cps at 25° C.

A second resole-furfuryl alcohol prepolymer was prepared using a different reaction time. In the second run, a mixture of 154 grams of Resole Resin No. 1 of Example I, 203 grams of water and 980 grams of furfuryl alcohol was acidified with aqueous sulfuric acid (30% by weight) to a pH value of 2.5. The reactants were gradually heated to a reaction temperature of 95°–98° C. and maintained at this temperature over a reaction period of 3.5 hours. The polymerization was terminated by addition of sufficient aqueous sodium hydroxide (30% by weight) to raise the pH value of the reaction mixture to 7.5. Thereafter water and furfuryl alcohol were removed from the reaction mixture under reduced pressure. The yield of resole-furfuryl alcohol prepolymer was 717 grams and the prepolymer has a Brookfield viscosity at 25° C. of 32,800 cps.

EXAMPLE IV

This Example illustrates the preparation of resole-furfuryl alcohol prepolymers from certain of the resole resins prepared in Example II. The general procedure of Example III was followed with the exception of varying the reactants, the reaction temperature, the reaction time, etc., as noted in Table III. The experimental details and data are recorded in Table III.

TABLE III

PREPARATION OF RESOLE FURFURYL ALCOHOL (RFA) PREPOLYMERS

| RFA Prepolymer | 1 | 2 | 3 | 4 | 5 | 6 | 7 | 8 | 9 | 10 | 11 |
|---|---|---|---|---|---|---|---|---|---|---|---|
| Resole Number (Table II) | 1 | 1 | 2 | 2 | 3 | 6 | 4 | 7 | 8 | 9 | 10 |
| Formaldehyde-phenol ratio | 1.5 | 1.5 | 2.0 | 2.0 | 2.0 | 2.73 | 2.73 | 3 | 3 | 4 | 4.1 |
| Amount of resole, g. | 139 | 348 | 154 | 385 | 77 | 385 | 1235.5 | 92 | 460 | 460 | 184 |
| Furfuryl alcohol, g. | 980 | 2450 | 980 | 2450 | 490 | 2450 | 6860 | 490 | 2450 | 2450 | 980 |
| Furfuryl Alcohol, moles | 10 | 25 | 10 | 25 | 5 | 25 | 70 | 5 | 25 | 25 | 10 |
| Water, g. | 200 | 500 | 200 | 500 | 100 | 500 | 1400 | 100 | 500 | 500 | 200 |
| Reaction temp., ° C. | 100 | 100 | 100 | 100 | 100 | 100 | 100 | 100 | 100 | 100 | 100 |
| Reaction time, minutes | 60 | 60 | 60 | 60 | 120 | 60 | 120 | 120 | 60 | 60 | 60 |
| Yield RFA prepolymer, g. | 1045 | ND* | 1045 | ND* | 509 | 2492 | 7564 | 534 | ND* | ND* | 1076 |
| Volatiles | 263 | 751 | 283 | 645 | 161 | 745 | 1874 | 149 | 643 | 688 | 283 |

*ND not determined

EXAMPLE V

This Example illustrates the preparation of a phenol-formaldehyde-furfuryl alcohol prepolymr (PFFA) by a one-stage process employing an acid catalyst.

A reaction vessel was charged with 94.0 grams of phenol (1.0 mole), 162.2 grams of formalin containing 37% by weight of formaldehyde (2 moles), 980.0 grams of furfuryl alcohol (10 moles), and 101 grams of water. The pH value of the reactants was adjusted to 2.5 by addition of aqueous sulfuric acid (30% by weight). The reaction mixture was gradually heated to a reaction temperature of 93°–95° C. and this temperature was maintained over a reaction period of 3 hours. Thereafter the pH value of the reaction mixture was adjusted to 7.5 by addition of aqueous sodium hydroxide solution (30% by weight).

The reaction mixture separated into an aqueous layer (105 grams) which was withdrawn. The volatiles in the organic layer were stripped under reduced pressure to a fial pot temperature of 60° C. at 1 Torr. The yield of phenol-formaldehyde-furfuryl alcohol prepolymer was 754.6 grams and the Brookfield viscosity of the prepolymer was 780 cps. at 25° C.

EXAMPLE VI

This Example illustrates the preparation of additional phenol-formaldehyde-furfuryl alcohol (PFFA) prepolymers following the general procedure of Example V with the exception of varying the quantities of reactants, reaction conditions, etc. as noted in Table IV. The experimental details and experimental data thus obtained are recorded below in Table IV.

TABLE IV

PREPARATION OF PHENOL-FORMALDEHYDE-FURFURYL-ALCOHOL (PFFA) PREPOLYMERS

| | | | |
|---|---|---|---|
| Phenol, g | 94 | 94 | 94 |
| Phenol, moles | 1 | 1 | 1 |
| Formalin, g. | 162.2 | 324.4 | 324.4 |
| Formalin, moles | 2 | 4 | 4 |
| Furfuryl Alcohol, g. | 980 | 980 | 980 |
| Furfuryl Alcohol, moles | 10 | 10 | 10 |
| Water, g. | 101 | 101 | none |
| pH of Reaction | 2.5 | 2.5 | 2.0 |
| Reaction Temperature, ° C | 93–5 | 97–8 | 92–6 |
| Reaction Time, hr. | 3 | 3 | 3 |
| Yield of PFFA Prepolymer | 758 | 441 | 666 |
| Voltiles, g. | 562 | 863 | 676 |

EXAMPLE VII

This Example illustrates the preparation of phenol-formaldehyde-furfuryl alcohol (PFFA) prepolymers by reacting the phenol and formaldehyde under alkaline conditions in a first stage, adding furfuryl alcohol to the reaction mixture, and thereafter continuing the reaction under acidic conditions in a second stage. The experimental details are set out in Table V.

In the first stage, the indicated amounts of formaldehyde (37% aqueous solution) and phenol were added to a reaction vessel and the pH value was adjusted to 8.5–9 by addition of an aqueous sodium hydroxide solution (30% by weight). The reaction mixture was gradually heated to a reaction temperature of 90° C., and this temperature was maintained over a reaction period of 2 hours. Thereafter, the reaction mixture was cooled to 40° C.

In the second stage, 980 grams (10 moles) of furfuryl alcohol was added. The pH value of the reaction mixture was adjusted to 2.5 by addition of aqueous sulfuric acid (30% by weight). The reaction mixture was gradually heated to a reaction temperature of 100° C., and was maintained at this temperature over a reaction period of 2 hours. Thereafter the reaction mixture was neutralized to a pH value of 7.5 by addition of sodium hydroxide solution (30% by weight). Water and some unreacted furfuryl alcohol was removed from the reaction mixture under reduced pressure. The yields of phenol-formaldehyde furfuryl alcohol prepolymers and the volatile contents thereof were as indicated in Table V.

TABLE V
PREPARATION OF PHENOL-FORMALDEHYDE-FURFURYL ALCOHOL (PFFA) PREPOLYMERS

| PFFA Prepolymer No. | 1 | 2 | 3 | 4 | 5 |
|---|---|---|---|---|---|
| Stage I | | | | | |
| Phenol, g. | 94 | 94 | 94 | 94 | 94 |
| Phenol, moles | 1 | 1 | 1 | 1 | 1 |
| Formaldehyde (37%), g. | 162 | 324 | 324 | 324 | 486 |
| Formaldehyde, moles | 2 | 4 | 4 | 4 | 6 |
| Formaldehyde-phenol ratio | 2 | 4 | 4 | 4 | 6 |
| Reaction pH | 8.5-9 | 8.5-9 | 8.5-9 | 8.5-9 | 8.5-9 |
| Reaction temp., °C | 90 | 90 | 90 | 90 | 90 |
| Reaction time, min. | 120 | 120 | 120 | 120 | 120 |
| Stage II | | | | | |
| Furfuryl Alcohol, g. | 980 | 980 | 980 | 980 | 980 |
| Furfuryl Alcohol, moles | 10 | 10 | 10 | 10 | 10 |
| Reaction pH | 2.5 | 2.5 | 2.5 | 2.5 | 2.5 |
| Reaction temp., °C | 100 | 100 | 100 | 100 | 100 |
| Reaction time, min. | 240 | 60 | 60 | 60 | 120 |
| Yield of PFFA Prepolymer, g | 825 | 1111 | 1110 | 805 | 821 |
| Volatiles, g. | 379 | 272 | 283 | 530 | 668 |

EXAMPLE VIII

This Example illustrates the preparation of three cellular copolymers, i.e., foams, from one specific resolefurfuryl alcohol (RFA) prepolymer. However, it is understood that prepolymers prepared in accordance with any one of the preceding examples may be substituted in the general procedure of this Example.

The prepolymer employed in this Example was prepared from Resole No. 1 in Table I of Example I. This resole was prepared using a formaldehyde to phenol ratio of 2.75, and 169.4 grams thereof was admixed with 1078 grams of furfuryl alcohol and 223.3 grams of water. The pH value of the resultant reaction mixture was adjusted to 2.5 by addition of aqueous sulfuric acid (30% by weight). The reaction mixture was gradually heated to 97°–101° C. and this temperature was maintained for a reaction period of 2.5 hours. The reaction mixture was then cooled and neutralized to a pH value of 7.5 by addition of aqueous sodium hydroxide solution (30% by weight). Thereafter substantially all of the water and a portion of the unreacted furfuryl alcohol were removed under reduced pressure. The yield of prepolymer was 935 grams.

The resultant resole-furfuryl alcohol (RFA) prepolymer, the surfactant, the fluorocarbon blowing agent and the polyisocyanate were blended together in the amounts noted in Table VI. Thereafter an admixture of an amine polyol and a catalyst blend was added thereto via a syringe. After intense mixing for 30 seconds, foaming occurred and the foam was allowed to cure.

The surfactant was DC-193, a proprietary product of Dow Corning, which is said to be a polyalkylsiloxane-polyoxyalkylene copolymer. The fluorocarbon blowing agent was F-113, which is trichlorotrifluoroethane. The polyisocyanate was a proprietary crude diphenylmethane diisocyanate sold under the trademane PAPI. The amine polyol was a proprietary product of Jefferson Chemical Company sold under the trademark Thanol polyol R-350 X, which has a hydroxyl number of 530 and a nitrogen content of 4.17% by weight and is said to be prepared by the reaction of propylene oxide with the Mannich condenstion product of phenol-formaldehyde and diethanolamine. The catalyst included DBTDA, which is dibutyltin diacetate.

The cured foam was tested by conventional prior art techniques, e.g., ASTM* procedures, to determine the density in pounds per cubic foot. The percent of closed cells (corrected) in the cellular

*ASTM refers to the American Society for Testing Materials structure, and the properties measured by the Butler Chimney test, namely, the retained weight percent, the flame height in inches, the time to self-extinguish in seconds, and the visual estimate of the smoke. The cured foam properties were determined by the following test methods:

| Foam Property | Test Method |
|---|---|
| Density | ASTM D-1622-63 (1970) |
| Flame Retardancy (Butler Chimney Test) | ASTM D-3014 |

The experimental details and data thus obtained are recorded hereinafter in Table VI.

TABLE VI
FOAMS FROM RESOLE-FURFURYL ALCOHOL(RFA) PREPOLYMERS

| Foam Number | 1 | 2 | 3 |
|---|---|---|---|
| COMPONENT A | | | |
| RFA Prepolymer, g. | 50 | 50 | 50 |
| Surfactant (DC 193), g. | 0.5 | 0.5 | 0.5 |
| F-113, g. | 8 | 8 | 8 |
| COMPONENT B | | | |
| PAPI, g. | 25 | 25 | 25 |
| COMPONENT C | | | |
| Phosphoric acid (85%), g. | 7.5 | — | 7.5 |
| Ethyl acid phosphate, g. | — | 10 | — |
| THANOL, Polyol R-350X, g. | 5 | 5 | 5 |
| DBTDA, g. | — | 0.2 | 0.2 |
| PROPERTIES | | | |
| Density, pcf. | 1.2 | 1.1 | 0.9 |
| Closed cell, corr. % | 6 | 17 | 7 |
| Butler Chimney test | | | |
| wt, retained, % | 93 | 93 | 95 |
| flame ht., in. | 5 | 3 | 4 |
| time to SX, sec. | 10 | 10 | 10 |
| smoke, visual estimate | med | med | light |

The foregoing Examples are illustratitive of the presently preferred process for preparing foams from the prepolymer of the invention and an organic polyisocyanate. Other general procedures and processes useful in preparing modified foams may be similar to those disclosed in U.S. Pat. Nos. 2,608,536, 3,389,094, 3,470,118, 3,682,845, 3,686,101, 3,770,671 and 3,872,034, the disclosures of which are incorporated herein by reference. Unmodified foams may be prepared from the prepolymers of the invention by the general process of Example VIII upon omitting the polyisocyanate, THANOL polyol R-350X and DBTDA from the formulation of Table VI. Other acid, catalysts and processes useful in preparing foams or solid cured products may be similar to those disclosed in U.S. Pat. Nos. 2,471,631, 3,299,167, 3,312,650, 3,390,107, 3,567,662, 3,692,706 and 3,725,333, the disclosures of which are incorporated herein by reference. Still additional processes and conditions useful in preparing solid cured products and foams may be similar to those disclosed in the text, *Plastic Foams*, edited by Frisch, et al, Marcel Dekker, Inc., New York, New York, the disclosure of which is incorporated herein by reference. In many instances the curing catalysts and/or curing conditions for use in preparing a solid resin or solid polyisocyanate modified resin may be substantially the same as those used in preparing the corresponding cellular polymer with the exception of omitting the foaming or frothing agent, or omitting other ingredients and/or conditions which are responsible for the formation of the cellular structure.

We claim:

1. A reactive liquid composition which may be cured in the presence of an acid catalyst to produce a rigid flame retardant interpolymer, the said composition consisting essentially of (1) a liquid prepolymer comprising at least three interpolymerized monomers including (a) a hydroxy aromatic compound selected from the group consisting of phenol, resorcinol, cresol, xylenol, chlorophenol, bisphenol-A, alpha-naphthol and beta-naphthol, (b) an aldehyde containing about 1-8 carbon atoms which is interpolymerizable with the said hydroxy aromatic compound, and (c) furfuryl alcohol, the said prepolymer having a viscosity of about 100-500,000 centipoises at 25° C, and containing about 1.1-6 moles of interpolymerized aldehyde and about 3.1-15 moles of interpolymerized furfuryl alcohol for each mole of the hydroxy aromatic compound interpolymerized therewith, and (2) about 1-10 moles of unpolymerized furfuryl alcohol for each mole of the said interpolymerized hydroxy aromatic compound.

2. The composition of Claim 1 wherein the said prepolymer has about 1.5-3 moles of the said aldehyde and about 3.1-8 moles of furfuryl alcohol interpolymerized with each mole of the said hydroxy aromatic compound.

3. The composition of claim 1 wherein about 3-8 moles of unpolymerized furfuryl alcohol are present for each mole of the said interpolymerized hydroxy aromatic compound.

4. The composition of claim 1 wherein the said hydroxy aromatic compound is phenol and the said aldehyde is formaldehyde.

5. The composition of claim 4 wherein the said prepolymer has about 1.1-3 moles of formaldehyde and about 3.1-8 moles of furfuryl alcohol interpolymerized with each mole of phenol.

6. The composition of claim 4 wherein about 3-8 moles of unpolymerized furfuryl alcohol are present for each mole of interpolymerized phenol.

7. The composition of claim 6 wherein the said prepolymer has about 1.5-3 moles of formaldehyde and about 3.1-8 moles of furfurly alcohol interpolymerized with each mole of phenol.

8. A hardened flame retardant interpolymer prepared by curing a reactive liquid composition in the presence of an acid catalyst, the said composition consisting essentially of (1) a liquid prepolymer comprising at least three interpolymerized monomers including (a) a hydroxy aromatic compound selected from the group consisting of phenol, resorcinol, cresol, xylenol, chlorophenol, bisphenol-A, alphanaphthol and beta-naphthol, (b) an aldehyde containing about 1-8 carbon atoms which is interpolymerizable with the said hydroxy aromatic compound, and (c) furfuryl alcohol, the said prepolymer having a viscosity of about 100-500,000 centipoises at 25° C. and containing about 1.1-6 moles of interpolymerized aldehyde and about 3.1-15 moles of interpolymerized furfuryl alcohol for each mole of the hydroxy aromatic compound interpolymerized therewith, and (2) about 1-10 moles of unpolymerized furfuryl alcohol for each mole of the said interpolymerized hydroxy aromatic compound.

9. The hardened interpolymer of claim 8 wherein the said liquid prepolymer in the said composition has about 1.5-3 moles of the said aldehyde and about 3.1-8 moles of furfuryl alcohol interpolymerized with each mole of the said hydroxy aromatic compound.

10. The hardened interpolymer of claim 8 wherein the said composition has present therein about 3-8 moles of unpolymerized furfuryl alcohol for each mole of the said interpolymerized hydroxy aromatic compound, and the said unpolymerized furfuryl alcohol is cured with the said liquid prepolymer.

11. The hardened interpolymer of claim 8 wherein the said hydroxy aromatic compound is phenol and the said aldehyde is formaldehyde.

12. The hardened interpolymer of claim 11 wherein the said liquid prepolymer in the said composition has about 1.1-3 moles of formaldehyde and about 3.1-8 moles of furfuryl alcohol interpolymerized with each mole of phenol.

13. The hardened interpolymer of claim 11 wherein the said composition has present therein about 3-8 moles of umpolymerized furfuryl alcohol for each mole of interpolymerized phenol, and the said unpolymerized furfuryl alcohol is cured with the said liquid prepolymer.

14. The hardened interpolymer of claim 13 wherein the said liquid prepolymer in the said composition has about 1.5-3 moles of formaldehyde and about 3.1-8 moles of furfuryl alcohol interpolymerized with each mole of phenol.

15. A rigid flame retardant cellular interpolymer prepared by curing a reactive liquid composition in the presence of a foaming agent and an acid catalyst, the said composition consisting essentially of (1) a liquid prepolymer comprising at least three interpolymerized monomers including (a) a hydroxy aromatic compound selected from the group consisting of phenol, resorcinol, cresol, xylenol, chlorophenol, bisphenol-A, alpha-naphthol and beta-naphthol, (b) an aldehyde containing about 1-8 carbon atoms which is interpolymerizable with the said hydroxy aromatic compound, and (c) furfuryl alcohol, the said prepolymer having a viscosity of about 100-500,000 centipoises at 25° C. and containing about 1.1-6 moles of interpolymerized aldehyde and about 3.1-15 moles of interpolymerized furfuryl alcohol for each mole of the hydroxy aromatic compound interpolymerized therewith, and (2) about 1-10 moles of unpolymerized furfuryl alcohol for each mole of the said interpolymerized hydroxy aromatic compound.

16. The cellular interpolymer of claim 15 wherein the said liquid prepolymer in the said composition has about 1.5-3 moles of the said aldehyde and about 3.1-8 moles of furfuryl alcohol interpolymerized with each mole of the said hydroxy aromatic compound.

17. The cellular interpolymer of claim 15 wherein the said composition has present therein about 3-8 moles of unpolymerized furfuryl alcohol for each mole of the said interpolymerized hydroxy aromatic compound, and the said unpolymerized furfuryl alcohol is cured with the said liquid prepolymer.

18. The cellular interpolymer of claim 15 wherein the said hydroxy aromatic compound is phenol and the said aldehyde is formaldehyde.

19. The cellular interpolymer of claim 18 wherein the said liquid prepolymer in the said composition has about 1.1-3 moles of formaldehyde and about 3.1-8 moles of furfuryl alcohol interpolymerized with each mole of phenol.

20. The cellular interpolymer of claim 18 wherein the said composition has present therein about 3-8 moles of umpolymerized furfuryl alcohol for each mole of interpolymerized phenol, and the said unpolymerized furfuryl alcohol is cured with the said liquid prepolymer.

21. The cellular interpolymer of claim 20 wherein the said liquid prepolymer in the said composition has about 1.5-3 moles of formaldehyde and about 3.1-8 moles of furfuryl alcohol interpolymerized with each mole of phenol.

22. A process for preparing a flame retardant hardened interpolymer comprising curing a reactive liquid composition in the presence of an acid catalyst to produce the said hardened interpolymer, the said composition consisting essentially of (1) a liquid prepolymer comprising at least three interpolymerized monomers including (a) a hydroxy aromatic compound selected from the group consisting of phenol, resorcinol, cresol, xylenol, chlorophenol, bisphenol-A, alpha-naphthol and beta-naphthol, (b) an aldehyde containing bout 1-8 carbon atoms which is interpolymerizable with the said hydroxy aromatic compound, and (c) furfuryl alcohol, the said prepolymer having a viscosity of about 100-500,000 centipoises at 25° C. and containing about 1.1-6 moles of interpolymerized aldehyde and about 3.1-15 moles of interpolymerized furfuryl alcohol for each mole of the hydroxy aromatic compound interpolymerized therewith, and (2) about 1-10 moles of unpolymerized furfuryl alcohol for each mole of the said interpolymerized hydroxy aromatic compound.

23. The process of claim 22 wherein the said liquid prepolymer in the said composition has bout 1.5-3 moles of the said aldehyde and about 3.1-8 moles of furfuryl alcohol interpolymerized with each mole of the said hydroxy aromatic compound.

24. The process of claim 22 wherein the said composition has present therein about 3-8 moles of unpolymerized furfuryl alcohol for each mole of the said interpolymerized hydroxy aromatic compound, and the said unpolymerized furfuryl alcohol is cured with the said liquid prepolymer.

25. The process of claim 22 wherein the said hydroxy aromatic compound is phenol and the said aldehyde is formaldehyde.

26. The process of claim 25 wherein the said liquid prepolymer in the said composition has about 1.1-3 moles of formaldehyde and about 3.1-8 moles of furfuryl alcohol interpolymerized with each mole of phenol.

27. The process of claim 25 wherein the said composition has present therein about 3-8 moles of unpolymerized furfuryl alcohol for each mole of interpolymerized phenol, and the said unpolymerized furfuryl alcohol is cured with the said liquid prepolymer.

28. The process of claim 27 wherein the said liquid prepolymer in the said composition has about 1.5-3 moles of formaldehyde and about 3.1-8 moles of furfuryl alcohol interpolymerized with each mole of phenol.

29. A process for preparing a flame retardant rigid cellular interpolymer comprising curing a reactive liquid composition in the presence of a foaming agent and an acid catalyst to produce the said cellular interpolymer, the said composition consisting essentially of (1) a liquid prepolymer comprsing at least three interpolymerized monomers including (a) a hydroxy aromatic compound selected from the group consisting of phenol, resorcinol, cresol, xylenol, chlorophenol, bisphenol-A alpha-naphthol and beta-naphthol, (b) an aldehyde containing about 1-8 carbon atoms which is interpolymerizable with the said hydroxy aromatic compound, and (c) furfuryl alcohol, the said prepolymer having a viscosity of about 100-500,000 centipoises at 25° C. and containing about 1.1-6 moles of interpolymerized aldehyde and about 3.1-15 moles of interpolymerized furfuryl alcohol for each mole of the hydroxy aromatic compound interpolymerized therewith, and (2) with 1-10 moles of unpolymerized furfuryl alcohol for each mole of the said interpolymerized hydroxy aromatic compound.

30. The process of claim 29 wherein the said liquid prepolymer in the said composition has about 1.5-3 moles of the said aldehyde and about 3.1-8 moles of furfuryl alcohol interpolymerized with each mole of the said hydroxy aromatic compound.

31. The process of claim 29 wherein the said composition has present therein about 3-8 moles of unpolymerized furfuryl alcohol for each mole of the said interpolymerized hydroxy aromatic compound, and the said unpolymerized furfuryl alcohol is cured with the said liquid prepolymer.

32. The process of claim 29 wherein the said hydroxy aromatic compound is phenol and the said aldehyde is formaldehyde.

33. The process of claim 32 wherein the said liquid prepolymer in the said composition has about 1.1-3 moles of formaldehyde and about 3.1-8 moles of furfuryl alcohol interpolymerized with each mole of phenol.

34. The process of claim 32 wherein the said composition has present therein about 3-8 moles of unpolymerized furfuryl alcohol for each mole of interpolymerized phenol, and the said unpolymerized furfuryl alcohol is cured with the said liquid prepolymer.

35. The process of claim 34 wherein the said liquid prepolymer in the said composition has about 1.5-3 moles of formaldehyde and about 3.1-8 moles of furfuryl alcohol interpolymerized with each mole of phenol.

36. A process for preparing a reactive liquid prepolymer which may be cured in the presence of an acid catalyst to produce a hardened interpolymer comprising interpolymerizing furfuryl alcohol with a substance interpolymerizable therewith selected from the group consisting of (1) an admixture containing (a) a hydroxy aromatic compound selected from the group consisting of phenol, resorcinol, cresol, xylenol, chlorophenol, bisphenol-A, alpha-naphthol and beta-naphthol and (b) an aldehyde containing about 1-8 carbon atoms which is interpolymerizable with the said hydroxy aromatic compound, (2) water soluble resoles of the said hydroxy aromatic compound and the said aldehyde, and (3) admixtures of (1) and (2), in an acidic aqueous reaction medium having a pH value below 5 to prepare a reactive liquid prepolymer which may be cured in the presence of an acid catalyst to produce a hardened interpolymer, the said acidic aqueous reaction medium initially containing about 1.1-6 moles of the said aldehyde for each mole of the said hydroxy aromatic compound when based upon the monomeric and interpolymerized forms thereof and about 4-25 moles of furfuryl alcohol for each mole of the said hydroxy aromatic compound when based upon the monomeric and interpolymerized forms thereof, and the interpolymerization being continued until the prepolymer thus prepared has a viscosity of about 100-500,000 centipoises at 25° C. and contains about 1.1-6 moles of interpolymerized aldehyde and about 3.1-15 moles of interpolymerized furfuryl alcohol for each mole of the hydroxy aromatic compound interpolymerized therewith, the said acidic aqueous reaction medium containing unpolymerized furfuryl alcohol in an amount of about 1-10 moles in excess of the amount of interpolymerized furfuryl alcohol present in the said prepolymer thus prepared for each mole of interpolymerized hydroxy aromatic compound, and the said excess unpolymerized furfuryl alcohol being present in an amount to serve as a fluidizing solvent for the said prepolymer and to increase the flame retardance of a hardened interpolymer prepared therefrom upon curing in the presence of an acid catalyst.

37. The process of claim 36 wherein the interpolymerization is continued until the said prepolymer thus prepared contains about 1.5–3 moles of the said aldehyde and about 3.1–8 moles of furfuryl alcohol interpolymerized with each mole of the said hydroxy aromatic compound.

38. The process of claim 36 wherein the said acidic aqueous reaction medium contains unpolymerized furfuryl alcohol in an amount of about 3–8 moles in excess of the amount of interpolymerized furfuryl alcohol present in the said prepolymer thus prepared for each mole of interpolymerized hydroxy aromatic compound.

39. The process of claim 36 wherein the interpolymerization is continued until the said prepolymer thus prepared contains about 1.5–3 moles of the said aldehyde and about 3.1–8 moles of furfuryl alcohol interpolymerized with each mole of the said hydroxy aromatic compound, the said acidic aqueous reaction medium contains unpolymerized furfuryl alcohol in an amount of about 3–8 moles in excess of the amount of interpolymerized furfuryl alcohol present in the said prepolymer thus prepared for each mole of interpolymerized hydroxy aromatic compound, and the said acidic aqueous reaction medium has a pH value of about 1–3.

40. The process of claim 36 wherein the said hydroxy aromatic compound, the said aldehyde and the said furfuryl alcohol are simultaneously interpolymerized in the acidic aqueous reaction medium.

41. The process of claim 40 wherein the interpolymerization is continued until the said prepolymer thus prepared contains about 1.5–3 moles of the said aldehyde and about 3.1–8 moles of furfuryl alcohol interpolymerized with each mole of the said hydroxy aromatic compound.

42. The process of claim 40 wherein the said acidic aqueous reaction medium contains unpolymerized furfuryl alcohol in an amount of about 3–8 moles in excess of the amount of interpolymerized furfuryl alcohol present in the said prepolymer thus prepared for each mole of interpolymerized hydroxy aromatic compound.

43. The process of claim 40 wherein the interpolymerization is continued until the said prepolymer thus prepared contains about 1.5–3 moles of the said aldehyde and about 3.1–8 moles of furfuryl alcohol interpolymerized with each mole of the said hydroxy aromatic compound, the said acidic aqueous reaction medium contains unpolymerized furfuryl alcohol in an amount of about 3–8 moles in excess of the amount of interpolymerized furfuryl alcohol present in the said prepolymer thus prepared for each mole of interpolymerized hydroxy aromatic compound, and the said acidic aqueous reaction medium has a pH value of about 1–3.

44. The process of claim 40 wherein the said hydroxy aromatic compound is phenol and the said aldehyde is formaldehyde.

45. The process of claim 44 wherein the interpolymerization is continued until the said prepolymer thus prepared contains about 1.5–3 moles of the said aldehyde and about 3.1–8 moles of furfuryl alcohol interpolymerized with each mole of the said hydroxy aromatic compound.

46. The process of claim 44 wherein the said acidic aqueous reaction medium contains unpolymerized furfuryl alcohol in an amount of about 3–8 moles in excess of the amount of interpolymerized furfuryl alcohol present in the said prepolymer thus prepared for each mole of interpolymerized hydroxy aromatic compound.

47. The process of claim 44 wherein the interpolymerization is continued until the said prepolymer thus prepared contains about 1.5–3 moles of the said aldehyde and about 3.1–8 moles of furfuryl alcohol interpolymerized with each mole of the said hydroxy aromatic compound, the said acidic aqueous reaction medium contains unpolymerized furfuryl alcohol in an amount of about 3–8 moles in excess of the amount of interpolymerized furfuryl alcohol present in the said prepolymer thus prepared for each mole of interpolymerized hydroxy aromatic compound, and the said acidic aqueous reaction medium has a pH value of about 1–3.

48. The process of claim 36 wherein about 1.1–6 moles of the said aldehyde for each mole of the said hydroxy aromatic compound are interpolymerized in an alkaline aqueous reaction medium having a pH value of about 7.5–11 to produce a water soluble resole-containing reaction mixture, about 4–25 moles of furfuryl alcohol for each mole of the said hydroxy aromatic compound are added to the resole-containing reaction mixture, the water soluble resole-containing reaction mixture is acidified to a pH value below 5 by addition of an acid thereto, and furfuryl alcohol is interpolymerized with the resole in the resultant acidic aqueous reaction medium.

49. The process of claim 48 wherein the interpolymerization is continued until the said prepolymer thus prepared contains about 1.5–3 moles of the said aldehyde and about 3.1–8 moles of furfuryl alcohol interpolymerized with each mole of the said hydroxy aromatic compound.

50. The process of claim 48 wherein the said acidic aqueous reaction medium contains unpolymerized furfuryl alcohol in an amount of about 3–8 moles in excess of the amount of interpolymerized furfuryl alcohol present in the said prepolymer thus prepared for each mole of interpolymerized hydroxy aromatic compound.

51. The process of claim 48 wherein the interpolymerization is continued until the said prepolymer thus prepared contains about 1.5–3 moles of the said aldehyde and about 3.1–8 moles of furfuryl alcohol interpolymerized with each mole of the said hydroxy aromatic compound, the said acidic aqueous reaction medium contains unpolymerized furfuryl alcohol in an amount of about 3–8 moles in excess of the amount of interpolymerized furfuryl alcohol present in the said prepolymer thus prepared for each mole of interpolymerized hydroxy aromatic compound, and the said acidic aqueous reaction medium has a pH value of about 1–3.

52. The process of claim 48 wherein the said hydroxy aromatic compound is phenol and the said aldehyde is formaldehyde.

53. The process of claim 52 wherein the interpolymerization is continued until the said prepolymer thus prepared contains about 1.5–3 moles of the said aldehyde and about 3.1–8 moles of furfuryl alcohol interpolymerized with each mole of the said hydroxy aromatic compound.

54. The process of claim 52 wherein the said acidic aqueous reaction medium contains unpolymerized furfuryl alcohol in an amount of about 3–8 moles in excess of the amount of interpolymerized furfuryl alcohol present in the said prepolymer thus prepared for each mole of interpolymerized hydroxy aromatic compound.

55. The process of claim 52 wherein the interpolymerization is continued until the said prepolymer thus prepared contains about 1.5–3 moles of the said aldehyde and about 3.1–8 moles of furfuryl alcohol interpolymerized with each mole of the said hydroxy aromatic compound, the said acidic aqueous reaction medium contains unpolymerized furfuryl alcohol in an amount of about 3–8 moles in excess of the amount of interpolymerized furfuryl alcohol present in the said prepolymer thus prepared for each mole of interpolymerized hydroxy aromatic compound, and the said acidic aqueous reaction medium has a pH value of about 1–3.

56. The process of claim 36 wherein (a) a water soluble preformed resole containing about 1.1–6 moles of the said aldehyde interpolymerized with each mole of the said hydroxy aromatic compound, and (b) about 4–25 moles of furfuryl alcohol for each mole of the said hydroxy aromatic compound in the resole are interpolymerized in the said acidic aqueous reaction medium.

57. The process of claim 56 wherein the interpolymerization is continued until the said prepolymer, thus prepared contains about 1.5–3 moles of the said aldehyde and about 3.1–8 moles of furfuryl alcohol interpolymerized with each mole of the said hydroxy aromatic compound.

58. The process of claim 56 wherein the said acidic aqueous reaction medium contains unpolymerized furfuryl alcohol in an amount of about 3–8 moles in excess of the amount of interpolymerized furfuryl alcohol present in the said prepolymer thus prepared for each mole of interpolymerized hydroxy aromatic compound.

59. The process of claim 56 wherein the interpolymerization is continued until the said prepolymer thus prepared contains about 1.5–3 moles of the said aldehyde and about 3.1–8 moles of furfuryl alcohol interpolymerized with each mole of the said hydroxy aromatic compound, the said acidic aqueous reaction medium contains unpolymerized furfuryl alcohol in an amount of about 3–8 moles in excess of the amount of interpolymerized furfuryl alcohol present in the said prepolymer thus prepared for each mole of interpolymerized hydroxy aromatic compound, and the said acidic aqueous reaction medium has a pH value of about 1–3.

60. The process of claim 56 wherein the said hydroxy aromatic compound is phenol and the said aldehyde is formaldehyde.

61. The process of claim 60 wherein the interpolymerization is continued until the said prepolymer thus prepared contains about 1.5–3 moles of the said aldehyde and about 3.1–8 moles of furfuryl alcohol interpolymerized with each mole of the said hydroxy aromatic compound.

62. The process of claim 60 wherein the said acidic aqueous reaction medium contains unpolymerized furfuryl alcohol in an amount of about 3–8 moles in excess of the amount of interpolymerized furfuryl alcohol present in the said prepolymer thus prepared for each mole of interpolymerized hydroxy aromatic compound.

63. The process of claim 60 wherein the interpolymerization is continued until the said prepolymer thus prepared contains about 1.5–3 moles of the said aldehyde and about 3.1–8 moles of furfuryl alcohol interpolymerized with each mole of the said hydroxy aromatic compound, the said acidic aqueous reaction medium contains unpolymerized furfuryl alcohol in an amount of about 3–8 moles in excess of the amount of interpolymerized furfuryl alcohol present in the said prepolymer thus prepared for each mole of interpolymerized hydroxy aromatic compound, and the said acidic aqueous reaction medium has a pH value of about 1–3.

* * * * *